Aug. 13, 1968  H. H. MACKAL ET AL  3,396,743
ORAL INFLATION VALVE
Filed Dec. 16, 1965  3 Sheets-Sheet 1

INVENTORS.
HENRY H. MACKAL
ARMEN BOGOSSIAN
BY
Alfred W. Nibber
ATTORNEY

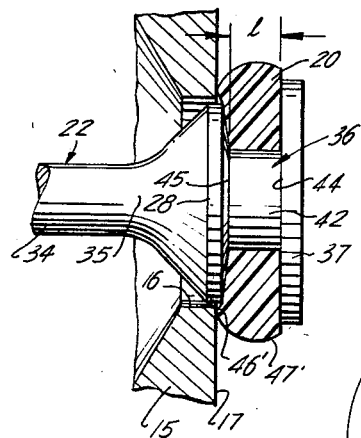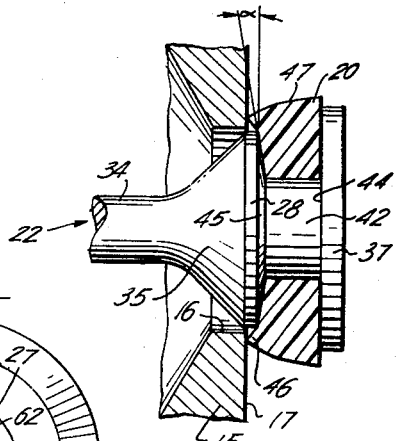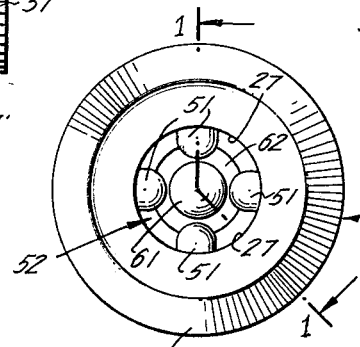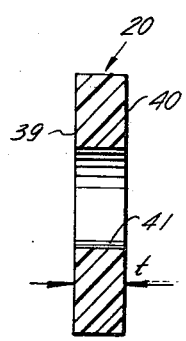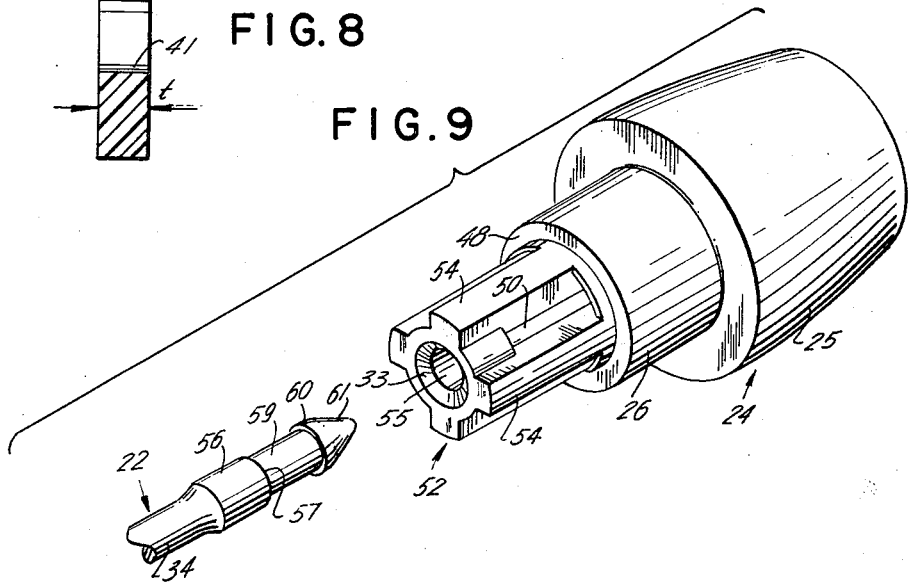

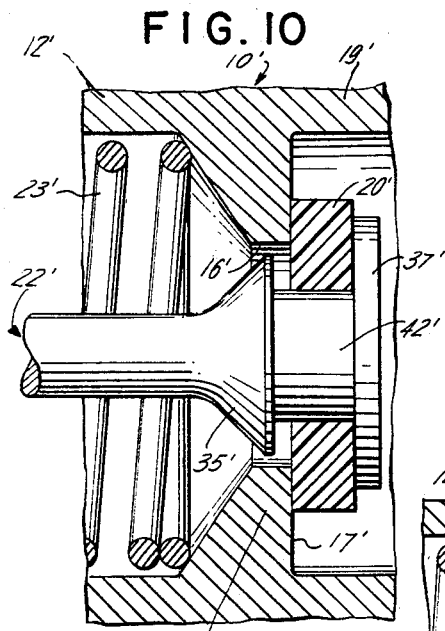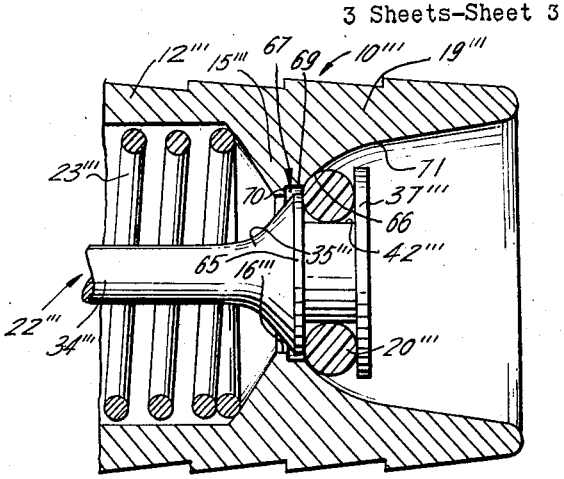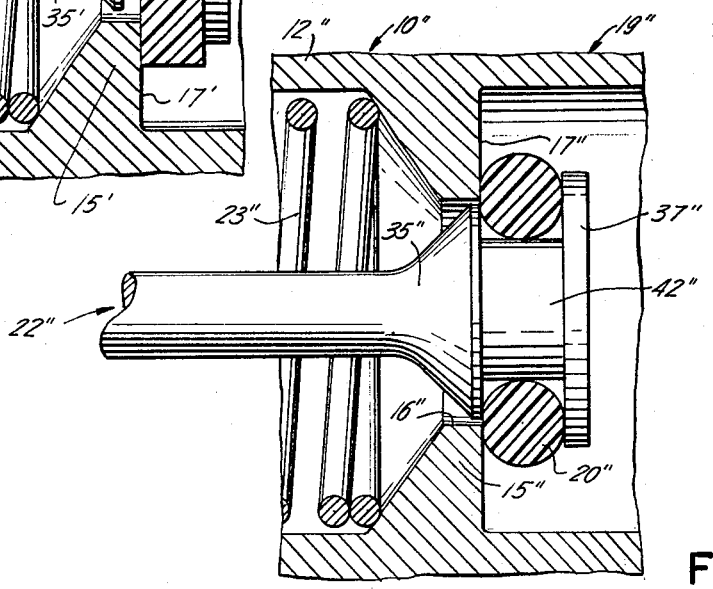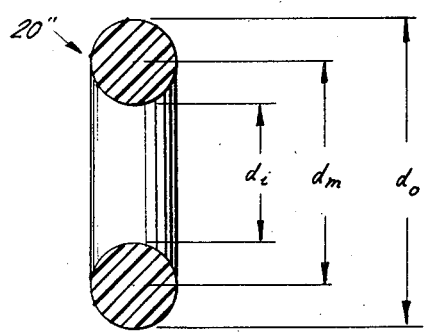

United States Patent Office 3,396,743
Patented Aug. 13, 1968

3,396,743
ORAL INFLATION VALVE
Henry H. Mackal, Fort Lauderdale, Fla., and Armen Bogossian, Teaneck, N.J., assignors to Halkey-Roberts Corporation, Paramus, N.J., a corporation of New Jersey
Filed Dec. 16, 1965, Ser. No. 514,351
14 Claims. (Cl. 137—223)

ABSTRACT OF THE DISCLOSURE

A fluid check valve, such valve being useful, for example, in the inflation and deflation of hollow articles such as life vests, life rafts, and the like. The valve has a body with a longitudinal passage therein, a transverse annular valve seat in the body disposed about the passage transversely thereto, and an inner valve element mounted in the passage for reciprocation longitudinally thereof between a forward, valve-open position and a rearward, valve-closed position. The valve element has an elongated stem which projects rearwardly and generally axially through the first valve seat, and a second valve seat disposed on the stem of the valve element forwardly of the first valve seat. A tubular fluid conducting member is reciprocably mounted within the rear end of the passage in the valve body, the rear end of the stem of the valve element being pivotally connected to the forward end of the tubular member, whereby the tubular member guides the rear end of the stem axially of the passage in the valve body while permitting the forward end of the stem and the second valve seat to tip out of the axis of such passage when the valve element is in open position.

---

The valve of the invention represents an improvement over that shown and claimed in Mackal Patent No. 2,855,946 and over other check valve presently in use for similar purposes. In its illustrative embodiment the valve of the present invention is particularly characterized by its lightness of weight and compactness in size, its provision of essentially straight-line flow of fluid through the valve so that it has a fluid-conducting capacity which markedly exceeds that of prior valves provided with cross bores in the inner movable valve element, eliminates the necessity for such cross bores with the difficulties attendant upon their formation, and provides for the positive screw locking of the valve in its closed position. Additionally, the valve of the invention maintains a seal between the cooperating seats thereof despite sidewise pressure on the outer movable valve stem and/or jiggling of such stem, even though the valve, not locked in closed position, is capable of successful operation over a much wider range of temperatures than former valves, provides for the self-centering of one valve seat relative to the other as the valve seats approach their valve-closed position, and in some preferred embodiments permits the use of a simple flat resilient annular member to form one of the cooperating seats of the valve. As a result of its novel construction, the valve is not only more economical to make than prior valves, but may be assembled much more easily and economically than prior valves.

The invention has among its objects the provision of a novel check valve which is particularly characterized by its lightness in weight, its compactness, and its large fluid-conducting capacity.

A further object of the invention lies in the provision of a check valve of the type indicated which is simply and economically manufactured and in which the parts may be assembled by essentially straight-line motions, so that the valve readily lends itself to machine assembly.

Another object of the invention is to provide a novel check valve which provides for essentially straight-line flow of fluid therethrough.

Yet another object of the invention is the provision of a check valve which incorporates a novel, swivelly connected two-part valve element, and which when closed maintains a seal between the cooperating seats thereof despite sidewise pressure on or sidewise motion of the outer valve stem relative to the body of the valve, even through the valve is not locked in closed position, and which provides for a novel self-centering of the inner movable valve element relative to the body of the valve as the element moves toward its valve-closed position.

Still another object of the invention is to provide, in a check valve of the type indicated immediately above, positive screw means for locking the valve in its closed position.

A still further object of the invention, in certain embodiments thereof, is to provide a novel valve seat which permits the use of an initially flat resilient seat-forming member, such seat deforming the resilient annular member to provide an annular bead-like seal-forming projection thereabout.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in longitudinal axial section through a first illustrative embodiment of valve in accordance with the invention, the valve being shown in its open position, certain of the parts being shown in elevation;

FIG. 5 is a fragmentary view in axial section on an enlarged scale showing the cooperating seats of the valve of FIGS. 1–4, inclusive, in sealing engagement but with the valve unlocked, certain of the parts being shown in elevation;

FIG. 6 is a view similar to FIG. 5 but with the valve in locked position and showing the annular resilient valve seat-forming member on the inner valve element further deformed by the positive locking of the valve;

FIG. 7 is a view in end elevation of the valve, the view being taken in the direction from left to right in FIGS. 1–3, inclusive;

FIG. 8 is a view in axial section through the unmounted annular resilient seat-forming member of the inner valve element of the valve;

FIG. 9 is a fragmentary view in perspective of parts forming the inner movable valve element of the valve, the parts being shown about to be assembled by straight-line movement toward each other;

FIG. 10 is a fragmentary view similar to FIG. 6 of a second illustrative embodiment of valve in accordance with the invention, the view showing the cooperating seats of the valve in sealing, locked engagement;

FIG. 11 is a fragmentary view similar to FIG. 6 of a third illustrative embodiment of valve in accordance with the invention, the view showing the cooperating seats of the valve in sealing, locked engagement;

FIG. 12 is a view in axial cross section through the unmounted O-ring which constitutes the resilient seat-forming member of the inner valve element of such third illustrative embodiment of valve; and FIG. 13 is a fragmentary view similar to FIG. 6 of a fourth illustrative embodiment of valve in accordance with the invention, the view showing the cooperating seats of the valve in sealing, locked engagement.

Figure 2:
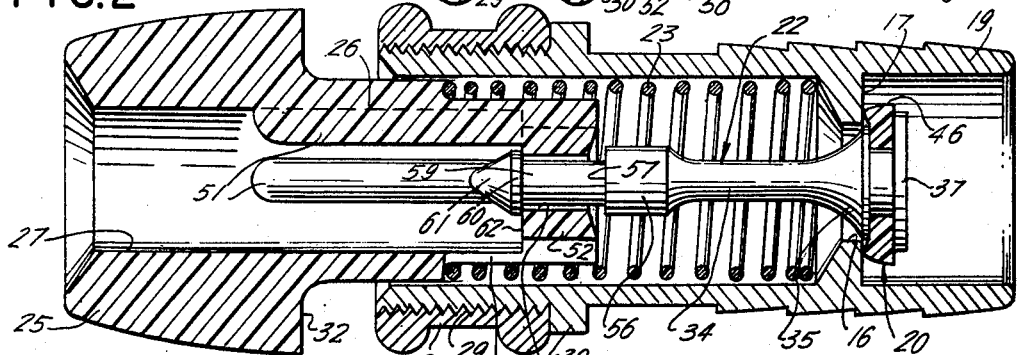
FIG. 2 is a view similar to FIG. 1 but with the valve shown in its closed but unlocked position.
Figure 3:
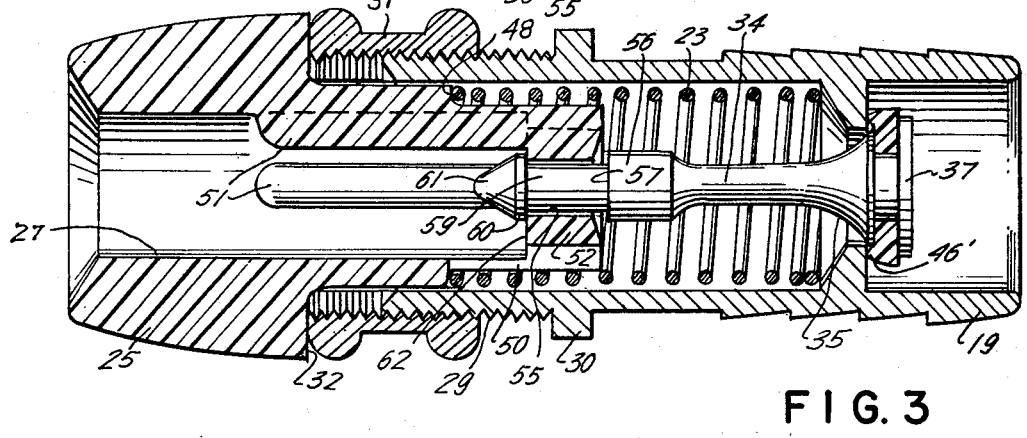
FIG. 3 is a view similar to FIGS. 1 and 2 with the valve in locked position.
Figure 4:
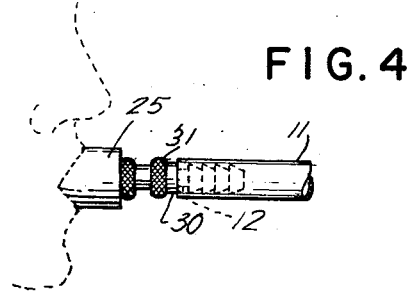
FIG. 4 is a view in side elevation on a smaller scale, the valve being shown mounted in a fragment of a tube adapted to be attached to an inflatable article, the inner movable element of the valve being shown in the inwardly thrust position which it assumes when the valve is open and such article is being inflated as by mouth pressure.

The first illustrative valve of the invention, shown in FIGS. 1–9, inclusive, is generally designated by the reference character 10. As shown in FIG. 4, the forward portion of the generally sleeve-like body 12 of the valve is adapted to be sealingly telescoped within the outer end of a flexible tube 11 (FIG. 4) which, as indicated, may be connected to an inflatable hollow article such as a life vest. The body 12 of the valve in the illustrative embodiment is made of a corrosion resistant metal such as nickel plated brass. The body 12 of the valve has a longitudinal bore 14 therethrough, there being a radially inwardly projecting annular flange 15 within the body adjacent the forward or inner end therefore. The flange 15 is provided with a relatively large central circular bore 16 therethrough, the flange having a transverse forward surface 17 which forms one of the cooperating seats of the valve. Forwardly of the flange 15, the body 12 is provided with a protective hood portion 19 having a bore therein of approximately the same diameter as bore 14 in the main part of the body 12.

The other seat of the valve is provided by the rear outer edge surface of a resilient sealing washer 20 which is mounted in a seat at the forward end of a reciprocable stem-like poppet member 22, likewise preferably formed of a corrosion-resistant metal such as nickel plated brass, which forms a part of a composite reciprocable inner valve element generally designated 21. Element 21 is composed of the above-mentioned stem-like member 22, which forms the forward end portion thereof, and a rear sleeve-like member fluid conducting guide 24 to the forward end of which the rear end of member 21 is connected for limited universal pivoting movement. As will appear hereinafter, the inner valve element 21 is constantly urged to the left toward the valve closed position of FIG. 2 by a coil compresion spring 23 which acts between the rear surface of the flange 15 and a spring seat on the forward end of member 24 of the inner valve element 21. Spring 23 may be formed, for example, of stainless steel. Gas such as air is introduced through the valve when the valve is in its open position through the member 24, the rear portion of which projects rearwardly from the body 12 of the valve.

The rear element 24 of the inner valve element 21 in the illustrative embodiment is made of a strong, tough material such as certain plastics. The element 24 is substantially rigid in its thicker sections but is resiliently yieldable in its forward, thinner annular portion, as will appear. Element 24 has an enlarged rear portion 25 which serves as a mouthpiece when the valve is employed as indicated in FIG. 4. When the mouthpiece 25 is made of plastic material as indicated in the drawings, the poor heat conductivity of such plastic material eliminates the necessity of providing it with a covering sleeve of rubber or rubber-like material as in some former valves. Member 24 has a central forward portion 26 having an outer surface of circular cylindrical shape which substantially sealingly fits within the rear portion of the bore 14 of the body 12 of the valve but is reciprocable with respect thereto. Element 24 has an axial bore 27 therethrough which communicates at its forward end with the forward portion of bore 14 in body 12 through ports 50, to be described. Thus air may be blown through the mouthpiece 25 into the bore 14 of the body 12 of the valve and thence through the open valve seats when the parts are in the position shown in FIG. 1, that is, with the inner valve element 21 thrust forwardly with respect to the body 12 against the opposition of the coil compression spring 23, which constantly urges the inner valve element rearwardly with respect to the body 12 into the valve closed position of FIG. 2.

Figure 1:
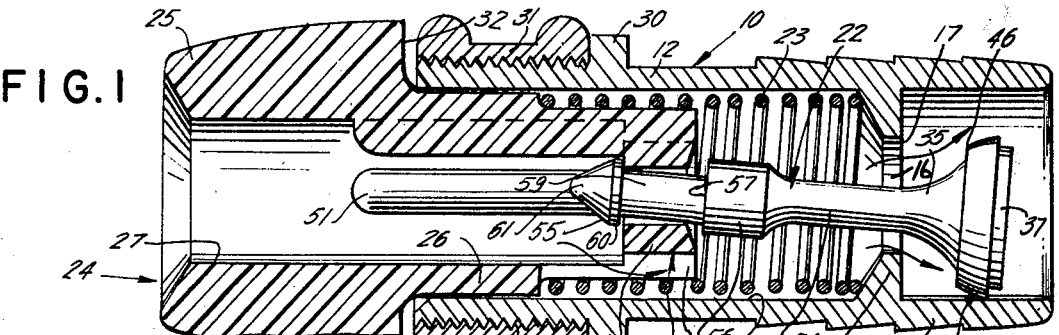

The valve is provided with means whereby the inner valve element 21 may selectively be locked and further tightened into the valve locked position of FIG. 3. For this purpose the body 12 of the valve is provided at its rear end with external threads 29 which extend from the rear end of body 12 forwardly to a radially outwardly extending annular flange 30 intermediate the length of the body 12 of the valve. Mounted upon the threads 29 on body 12 is a locking nut 31 which may be screwed forwardly into its inoperative, non-locking position abutting flange 30, as shown in FIGS. 1 and 2, and rearwardly into its operative, locking position shown in FIG. 3. In such latter position the rear end surface of the nut 31 engages the forwardly facing shoulder 32 on the mouthpiece portion 25 of member 24, thereby forcibly to thrust the inner valve element 21 to the left (FIG. 3) with respect to the body 12 of the valve whereby the valve is not only prevented from being opened, but the valve seats thereof are pulled more positively relatively toward each other into sealing engagement, as shown more clearly in FIG. 6. If desired, the thread 29 on body 12 and the cooperating thread on nut 31 may be made multiple threads, such as double threads, so that the nut may be advanced and retracted more rapidly than if a single thread were employed. The threads employed are of such pitch as to be irreversible, that is, when the nut is in its locking position, it can be advanced only by deliberately rotating it.

The forward member 22 of the inner valve element has an intermediate thin stem portion 34, there being a rearwardly converging frusto-conical portion 35 integrally attached to the forward end of portion 34 coaxially thereof. Forwardly of portion 35 the member 22 has an axially short circular cylindrical portion 28 which has a diameter slightly less than that of bore 16 in flange 15. Such portions 35 and 28 coact with the forward edge of the opening 16 through flange 15 to center the forward end of member 22 when the inner valve element 21 moves from its forward, valve-open position (FIG. 1) toward its rear, valve-closed position (FIG. 2). Forwardly of the forward end of portion 28, the member 22 is provided with an annular groove 36 which is bounded on its forward end by a circular head portion 37. The resilient sealing washer 20 is retained in the thus formed seat on member 22, and in the illustrative embodiment by reason of the configuration of such seat, is provided with an annular rearwardly facing sealing edge 46 despite the formation of the washer 20 from the flat material of uniform thickness.

The washer 20 in its relaxed condition is shown in FIG. 8. Such washer, which has uniform thickness $t$, has a rear face 39, a forward face 40, and a central cylindrical hole 41 therethrough. The forward surface 44 of the washer-receiving groove 36 on member 22 is disposed transverse to the axis of such member and is formed by the rear surface of the head 37 thereon. The rear surface 45 of groove 36 is of shallow frusto-conical shape, the frustum converging forwardly and having the elements thereof disposed at an angle $\alpha$ with respect to a transverse plane through the member 22. The angle $\alpha$ may be, for example, on the order of 5°. The circular cylindrical root 42 of the groove 36 has a diameter which at least slightly exceeds that of the hole 41 through the washer 20 when the washer is relaxed, so that when the washer is positioned in the groove 36 on member 22 the washer is subjected to radial stretching. The outer diameter of the forward surface 44 of groove 36 somewhat exceeds that of the rear surface 45 of such groove, that is, the largest diameter of the frusto-conical portion 35.

As a result of such relationships, when the washer 20 is mounted in groove 36 but is subjected to no axial distortion other than that caused by the parts of the groove, the washer tends to bulge rearwardly over the outer edge of the rear wall of the groove 36, thereby to provide the above described rearwardly facing annular sealing portion 46 thereon. The peripheral surface of the washer is somewhat rounded, as shown at 47 in FIG. 5. Such annular portion 46 somewhat exceeds the diameter of the central opening 16 through the flange 15 of the valve body so that when the inner valve element is in the closed position of FIGS. 2 and 5, such portion 46, which is thrust rearwardly by spring 23, sealingly engages an annular zone of the flat forward wall 17 of flange 15. By reason of the interaction of the frusto-conical portion 35 of member 22, the rear, larger diametered end of which has a diameter which equals or is slightly smaller than that of the opening 16 in flange 15, the forward end of member 22 is automatically centered with respect to such opening 16 in flange 15 as the inner valve member approaches its closed position.

When the nut 31 is screwed rearwardly upon the body of the valve to lock the latter, as shown in FIG. 3, the washer 20 is further distorted so that it assumes the configuration shown in FIG. 6. The portion 22 of the inner valve member is then thrust more forcibly to the left with respect to the flange 15, and the radially outer rear annular zone of the washer is further flattened to form a sealing zone 46' of appreciable radial width. Such further distortion of the washer 20 results in the further rounding of its peripheral surface as shown at 47'.

The manner of interengagement between the forward member 22 and the rear member 24 of the inner valve element 21 to form the above-described pivotal connection therebetween will be more clearly apparent upon consideration of FIGS. 7 and 9. As there shown, the member 24 has the forwardly extending circular cylindrical portion 26. The forward end of portion 26 is longitudinally slotted (four slots shown) leaving four lands 49 which are spaced at equal angles about the axis of the member 24. Between successive lands 49 there are thus provided ports 50 which open laterally from the axial bore 27 within the member 24. Radially aligned with the lands 49 are radially inwardly and axially projecting longitudinal ribs 51. The forward end of portion 26 is in the form of a central transverse ring-like portion 52 having a central circular cylindrical bore 55 therein, the forward end of such bore being bordered by a frusto-conical surface 33 of large apex angle which converges rearwardly. The rear part of portion 26 of member 24 somewhat exceeds the forward part thereof in diameter. A shoulder 48 is provided between such forward part, which extends rearwardly somewhat beyond the rear ends of lands 49, and such rear part. There is thus formed an annular seat 54 for the rear end of the above-mentioned coil compression spring 23, as particularly shown in FIGS. 1, 2, and 3.

The rear end of the member 22 of the inner valve element is provided with an axially broad annular enlargement or flange 56 which is formed integrally with the rear end of the stem portion 34. Rearwardly of the flange 56 member 22 has a circular cylindrical portion 59, the portion 59 being joined to the flange 56 at a sharp transverse shoulder 57. The portion 59 has a diameter somewhat less than that of the rear flange 60 and of the forward flange 56. At the forward end of the portion 59 there is provided a second smaller diametered flange 60; the forward end of member 22 is completed by a forwardly converging generally conical end portion 61.

The bore 55 in ring-like portion 52 has a diameter which somewhat exceeds that of the portion 59 of member 22, and the axial length of the portion 59 somewhat exceeds the axial length of the bore 55 in the ring-like portion 52. The diameters of flanges 56 and 60 somewhat exceed the diameter of bore 55 in the ring-like portion 52. As above noted, in the embodiment shown the member 24 is formed of hard, tough plastic material, such as certain plastics, which in relatively thin sections is resiliently yieldable. Consequently, portions 22 and 24 may be assembled by axial movement of the two parts relative to each other. As a non-limiting example, member 24 may be injection molded of an acetal resin.

In assembling the valve, the washer 20 is first snapped into groove 36 in the forward end of member 22. This may be accomplished in a number of ways, perhaps the simplest of which is to mount the washer over the rear end of member 22 and then to slide the washer along the stem 34 and up the frusto-conical portion 35 until the washer snaps into position in groove 36. The nut 31 is screwed onto body 12, and the spring 23 is inserted therein. The member 22 with the washer 20 mounted thereon is then telescoped within the forward end of the body 12, and the portion 26 of member 24 is telescoped into the rear end of body 12. By the use of suitable tools (not shown), one of which engages the head 37 of member 22 and the other of which engages the rear end surface of member 24, the members 22 and 24 are strongly thrust toward each other to form the described pivotal connection therebetween. The frusto-conical or countersunk surface 33 on the forward end of portion 52 of member 24 serves to guide the head 60, 61 of member 22 into the bore 55.

During the latter part of such assembly, which is indicated schematically in FIG. 9 without the presence of the valve body 12, the head 61 of member 22 first enters the bore 55 of the ring-like portion 52 of member 24 thereby progressively expanding such portion 52 to permit the flange 60 to enter such bore. Upon continued travel of the parts toward each other, flange 60 travels through the bore and finally snaps inwardly of the inner edge of the rear surface 62 of the ring-like portion 52, which then resumes its normal relaxed shape. The parts 22 and 24 are thus permanently secured to each other so that they can not normally be separated by very considerable tensile forces, which may be on the order of 100 pounds or more, which would tend to pull them apart. Because of the described relationships between the interengaging portions of members 22 and 24, however, the member 22 has considerable freedom to tip relative to member 24 when the valve is open as shown in FIG. 1. Not only that, but when the valve is closed as shown in FIG. 2, vibration or tipping of the member 24 is not transmitted to the forward member 22. Thus the spring 23 holds the seats of the valve in secure sealing engagement (FIG. 2) even though substantial sidewise pressure may be exerted on the mouthpiece end 25 of member 24. Further, when the valve is locked as shown in FIG. 3, any slight misalignment between the abutting transverse surfaces on mouthpiece 25 and the rear end of nut 31 does not tend to unseat the rear outer edge of washer 20 from the seat on surface 17 of flange 15.

As can be seen in FIG. 1, the valve when open provides for substantially straight-line travel of air therethrough. Thus air travels inwardly through passage 27 in an inflating operation, is deflected only slightly in passing radially outwardly and then forwardly through ports 50, and then travels axially of the valve body 12 through the bore 16 in flange 15. Consequently, the valve when open provides for a large air conducting capacity therethrough, despite its relatively small overall diameter, and imposes little restriction to the flow of air therethrough and causes little turbulence therein. Thus the valve can be made of a much smaller size, for a similar air flow capacity, than prior valves where the axial bore in the mouthpiece member communicates with one or more cross bores in the forward end of the inner valve element. Additionally, the present valve eliminates the necessity of machining such cross bores. These are ordinarily produced by drilling, which is a difficult and exacting task, because of the relatively small diameter of the inner valve element.

Because of its greatly reduced size as compared to its predecessors having the same flow capacity, the valve of the present invention is particularly characterized by its lightness of weight. The essentially straight-line flow of air through the valve, and the resulting small back pressure which the valve imposes in the inflating tube, makes it possible to provide the portion 26 of member 24 with an outer diameter which at room temperature is somewhat less than the diameter of the bore 14 in valve body 12 without incurring an undue loss of air through the path provided between such bore and portion 26. Such difference in diameter may be, for example, on the order of a few thousandths of an inch. As a result of such construction, even though the parts 24 and 12 of the valve may have appreciably different coefficients of thermal expansion, such parts do not bind on each other despite subjection of the valve to a very extended range of temperatures. Thus valves made in accordance with the invention operate satisfactorily through a temperature range from about −80° F. to somewhat above 180° F., which is much more extended than that in which prior valves of generally the same type will operate, and which far exceeds any present specifications for check valves of this type.

In FIG. 10 there is shown a second embodiment of valve in accordance with the invention. Such figure shows the manner of cooperation between the valve seat-forming parts thereof when the valve is locked in closed position. Parts in FIG. 10 which are similar to those of the first described embodiment of FIGS. 1–9, inclusive, are designated by the same reference characters but with an added prime.

The outer body 12′ of the valve of FIG. 10 and the parts thereof are the same as those in the first described embodiment. The valve 10′ of FIG. 10 differs from the first described valve 10 in the manner of the mounting of the resilient seat-forming washer on the valve element 22′ and the manner of cooperation of such washer with the flange 17′ of the valve body. Thus in FIG. 10 the resilient washer 20′, which is formed from flat stock, has an axial thickness when relaxed which is somewhat less than the axial length of the groove 36′ on element 22′ within which the washer is received. The diameter of the central hole 41′ through the washer 20′ is the same as or slightly exceeds the diameter of the root 42′ of the groove 36′. Thus the washer, although stably held in groove 36′, may be readily mounted in the groove 36′ by being partially rolled over the forward end flange 37′ in a rearward direction or in a rearward direction over the circular cylindrical zone 28′ which borders the groove 36′ in the valve element 22′.

When the valve 10′ of FIG. 10 is either closed by the action of the coil compression spring (not shown) of the valve alone or is locked in such closed position by the action of its lock nut corresponding to nut 31 of the first described embodiment, the rear surface of the washer 20′ engages the forward surface 17′ of the flange 15′ over an extended annular zone. Such washer 20′, thus held in compression between the surface 17′ and the rear surface 44′ of the groove 36′, forms a secure seal between the body of the valve and the inner valve element thereof.

In FIGS. 11 and 12 there is fragmentarily shown a third preferred embodiment of the valve, which is there designated 10″. Parts of valve 10″ which are similar to those of valve 10 are designated by the same reference characters with added double primes. The valve 10″ has an outer body 12″ which is the same as the body 12 of the first described valve 10. The valve 10″ differs from valve 10 as to the character of the seat-forming member on the valve element 22″, and also as to the manner in which the seat-forming member is held on the valve element.

The seat-forming member 20″ of FIGS. 11 and 12 is in the form of a rubber-like O-ring which is snugly received within an annular groove 36″ adjacent the forward end of the valve element 22″. The O-ring 20″ has an outer diameter which somewhat exceeds the diameter of the bore 16″ through the flange 15″ of the valve body. In the embodiment shown the mean diameter of the O-ring substantially equals the diameter of such bore 16″.

The O-ring 20″ may be mounted within the annular groove 36″ by being rolled over either the front end flange 37″ on member 22″ or over the circular cylindrical portion 28 at the rear edge of the groove. The walls of groove 36″ both lie transverse to the axis of member 22″. The flange 37″ somewhat exceeds the mean diameter of the O-ring 20″ so that when the parts are tightened and locked together as shown in FIG. 11 there is no tendency for the O-ring to escape from the groove 36″. Instead, the flange 37″ strongly urges the O-ring rearwardly into sealing engagement with the forward annular corner at the junction of the bore 16″ and the forward face 17″ of the flange 15″. The seal thus formed is very secure, because of the high unit pressure between such annular corner of the flange and the narrow annular rear zone of the O-ring engaged by such corner and resiliently deformed thereby.

In FIG. 13 there is shown a fourth embodiment of valve in accordance with the invention. In such valve, which is fragmentarily shown, parts which are similar to those shown in FIG. 6 are designated by the same reference characters with an added triple prime.

In the valve 10‴ of FIG. 13 the seat-forming member 20‴ on the forward part 22‴ of the inner valve element is in the form of a rubber-like O-ring 20‴ which is seated in an annular groove in the forward end of part 22‴. Such groove is formed between a forward flange 37‴, similar to flange 37″ of FIG. 11, and a smaller diametered flange 65 disposed forwardly of the forward, larger diametered end of the frusto-conical portion 35‴ of part 22‴. The flange 65, which has an axially short circular cylindrical peripheral surface, has a diameter which somewhat exceeds the diameter of the central passage 16‴ through the flange 15‴ on body 12‴ of valve 10‴. The forward surface of flange 15‴ is provided with a seat 66 which is in the form of a forwardly open portion of a torus of circular section, the seat 66 being coaxial of the passage 16‴ through the flange 15‴. The radius of the section of the torus substantially equals that of the O-ring 20‴. The forward edge of seat 66 merges smoothly into a concave surface 71 which expands forwardly as shown.

Rearwardly of the radially inner edge of seat 66 there is provided an annular recess 67 having a circular cylindrical periphery 69 and a transverse rear surface 70 which leads radially inwardly to the forward edge of passage 16‴. When the valve 10‴ is closed, and even locked in closed position by the lock nut of the valve, the rear surface of flange 65 is spaced somewhat from surface 70 of the annular groove in flange 15‴. The flange 65, however, being of somewhat larger diameter than passage 16‴, functions as a positive stop against the retraction of the valve element 22‴ rearwardly through the valve body 12‴ under any eventuality. Such positive stop feature afforded by the flange 65 and surface 70 may, if desired, be incorporated in the first three embodiments of valve described herein.

The valve of the invention has been described primarily in its use as an inflation valve. It is to be understood, however, that such valve may be used to advantage for use where an opening must be selectively sealed against the passage of other fluids such as liquids.

In its use as the inflation valve for an inflatable article such as a life vest or the like, the valve may normally be retained in the closed but unlocked condition shown in FIG. 2, thereby avoiding any pronounced deformation of the annular sealing edge 46 of the washer 20. When the article is to be inflated, the operator places the mountpiece 25 in his mouth, and thrusts it forwardly of the valve body 12 against the moderate opposition of the coil compression spring 23, thereby to open the valve. The operator then blows into the mouthpiece. Between successive blows, the operator may allow the valve to close under the action of spring 23. When the article is fully inflated, the operator screws nut 31 rearwardly, thereby to lock the valve in closed position.

When it is desired to deflate the article, it is necessary only to screw the nut 31 forwardly, and then to press the member 24 forwardly into the valve body. This opens the valve, allowing the air in the article to escape between the now spaced valve seats and outwardly through the ports 50, the bore 14, and the passage 27.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. In a valve having first and second means providing first and second annular valve seats movable relative toward and away from each other, the valve when closed having one of said seats sealingly engaging the other along an annular zone lying in a plane, the improvement in one of said first and second means and the valve seat provided thereby which comprises, a stem-like member having an annular groove of substantial axial width at its root extending thereabout, a stem-like member having a first, smaller diameter immediately adjacent the first, rear peripheral edge of the groove, which lies nearer the other of said valve seats, and a second, larger diameter adjacent the second, forward peripheral edge of the groove, which lies further from the other of said valve seats, the axially forward wall of the groove lying in a plane normal to the axis of the stem-like member, the axially rear wall of the groove lying on the surface of the frustum of a cone having a large apex angle, which lies coaxial of the stem-like member, and which converges in a forward direction, and a washer made of resilient, fluid impervious rubber-like material seated in said groove, said washer when relaxed being flat and having an axial thickness substantially equal to the axial width of the root of the groove and a central hole therethrough having a diameter which is smaller than the root diameter of the groove, said washer when mounted in the groove being distorted by the root and forward and rear walls of the groove so as to form an axially rearwardly projecting annular seat-forming feather edge at the juncture of its peripheral and rear surfaces.

2. A check valve having a body with a longitudinal passage therein, a valve orifice comprising a first, annular valve seat in the body disposed about the passage generally transversely to the length of the passage, an inner valve element mounted in the passage to reciprocate generally longitudinally thereof between a forward position in which the valve is open and a rearward position in which the valve is closed, said valve element having an elongated stem which is disposed substantially axially of the passage when the valve is closed, a second valve seat disposed on the stem of the valve element forwardly of the first valve seat, said stem extending through the first valve seat and having the portion thereof which is located in the transverse plane of the first seat when the valve is open of substantially less diameter than the first seat, means for guiding the rear end of the stem for movement axially of the passage while permitting the stem to tip with respect to the first valve seat when the valve element lies in a forward, valve open position, said last named means comprising a reciprocable member guidingly mounted in the passage in the valve body rearwardly of the stem of the valve element for reciprocation relative to the valve body, and means pivotally connecting the rear end of the stem of the valve element to said reciprocable member at the axis of the passage, whereby the valve element and the member reciprocate together and the forward end of the valve element may tip relative to the axis of the member and the passage when the valve element and the member lie in a forward, valve open position, means to restore the forward end of the stem of the valve element to a position substantially axial of the passage when the valve element approaches valve-closed position, and yieldable means constantly urging the valve element rearwardly toward its valve closed position.

3. A check valve as claimed in claim 2, wherein the means pivotally connecting the rear end of the stem of the valve element to the said reciprocable member is so constructed and arranged as to provide universal tipping of the stem of the valve element relative to the reciprocable member.

4. A check valve as claimed in claim 2, wherein said yieldable means comprises a coil compression spring mounted within the passage in the valve body, telescoped about the rear end of the stem of the valve element, and compressively held between the rear surface of the flange and the forward end of reciprocable member.

5. A check valve as claimed in claim 2, wherein the valve is adapted for use as a low pressure inflation valve and wherein the reciprocable member comprises a tubular rear portion having a longitudinal bore, the tubular portion substantially sealingly engaging the valve body while being reciprocable relative thereto, and at least one port connecting the bore of the tubular portion with the portion of the passage in the body which extends to the rear of the flange.

6. A valve as claimed in claim 5, wherein the tubular rear portion of the reciprocable member extends a substantial distance rearwardly beyond the rear end of the valve body, whereby the valve may be opened by thrusting the outer end of the reciprocable member forwardly with respect to the valve body, and whereby fluid may be introduced through the open valve from the rear end of the reciprocable member.

7. A valve as claimed in claim 6, comprising means on the valve body for selectively engaging the portion of the reciprocable member rearwardly of the valve body for locking the reciprocable member and the valve element in their rear, valve closed position.

8. A valve as claimed in claim 6, comprising a nut threadedly mounted in telescopic relationship with the rear end of the valve body and adjustable from a forward retracted position to a rear, valve locking position in which its rear end lies a substantial distance rearwardly of the valve body, and means on the reciprocable member adapted to be engaged by the nut to lock the reciprocable member and the valve element in their valve closed position upon rearwardly travel of the nut into its rear position.

9. A check valve as claimed in claim 2, wherein the means pivotally connecting the stem of the valve element to the reciprocable member is in the form of a loose ball and socket connection, and wherein the ball may be snapped into the socket upon the assembly of the stem of the valve element and the member in the valve body.

10. A check valve as claimed in claim 9, wherein the socket portion of the pivotal connecting means is affixed to the forward end of the reciprocable member and the ball portion of the pivotal connecting means is affixed to the rear end of the stem of the valve element.

11. A check valve as claimed in claim 10, wherein at least one of the socket portion and the ball portion of the pivotal connecting means is made of hard but resiliently yieldable material, whereby said one portion is resiliently distorted upon the snapping of the ball portion into the socket portion.

12. A check valve as claimed in claim 2, comprising means for selectively locking the reciprocable member and the valve element in their rear, valve closed position.

13. A check valve as claimed in claim 2, wherein the stem of the valve element has an annular groove therein adjacent its forward end, the seat on the valve element comprising a resilient washer seated in said groove and having its radially outer edge portion overlying and sealingly engaging the forward face of the flange on the body when the valve is closed, said annular groove being of substantial axial width at its root, the axially forward and the axially rear walls of the groove lying in planes normal to the axis of the stem-like member, and said washer being made of resilient, fluid impervious rubber-like material, said washer when relaxed being flat and having an axial thickness substantially less than the axial width of the groove and a central hole therethrough having a diameter which is substantially the same as the root diameter of the groove.

14. A check valve as claimed in claim 2, wherein the stem of the valve element has an annular groove therein adjacent its forward end, the seat on the valve element comprising a resilient washer seated in said groove and having its radially outer edge portion overlying and sealingly engaging the forward face of the flange on the body when the valve is closed, said annular groove being of substantial axial width at its root, said washer being an O-ring made of resilient, fluid impervious rubber-like material, said washer when relaxed having an axial thickness substantially equal to the axial width of the groove and a central hole therethrough having a diameter which is substantially the same as the root diameter of the groove, the O-ring having a mean diameter which is at least substantially equal to the axial aperture through the transverse annular flange projecting inwardly of the longitudinal passage through the valve body, the axially forward wall of the annular groove having an outer diameter which substantially exceeds the main diameter of the O-ring.

References Cited

UNITED STATES PATENTS

| | | | |
|---|---|---|---|
| 2,355,288 | 8/1944 | Fritzinger | 251—84 X |
| 2,405,736 | 8/1946 | Daily et al. | 251—86 X |
| 2,502,301 | 3/1950 | Alderfer | 137—223 |
| 3,067,770 | 12/1962 | Fancher | 137—541 X |
| 3,310,064 | 3/1967 | Voos | 251—332 X |
| 3,351,081 | 11/1967 | Bogossian et al. | 137—541 X |

FOREIGN PATENTS 829,931  3/1960  Great Britain.

WILLIAM F. O'DEA, *Primary Examiner.*

D. H. LAMBERT, *Assistant Examiner.*